United States Patent
Ryder

(10) Patent No.: US 9,432,373 B2
(45) Date of Patent: Aug. 30, 2016

(54) ONE STEP SECURITY SYSTEM IN A NETWORK STORAGE SYSTEM

(75) Inventor: Scott Ryder, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/766,337

(22) Filed: Apr. 23, 2010

(65) Prior Publication Data

US 2011/0265157 A1    Oct. 27, 2011

(51) Int. Cl.

| | |
|---|---|
| G06F 7/04 | (2006.01) |
| G06F 15/16 | (2006.01) |
| G06F 17/30 | (2006.01) |
| H04L 29/06 | (2006.01) |
| G06F 12/00 | (2006.01) |
| G06F 12/14 | (2006.01) |
| G06F 13/00 | (2006.01) |
| G11C 7/00 | (2006.01) |
| G06F 11/00 | (2006.01) |
| G06F 12/16 | (2006.01) |
| G08B 23/00 | (2006.01) |
| G06F 21/00 | (2006.01) |
| H04L 29/08 | (2006.01) |

(52) U.S. Cl.
CPC .......... H04L 63/10 (2013.01); H04L 67/1097 (2013.01)

(58) Field of Classification Search
USPC ............................................... 726/6
See application file for complete search history.

(56) References Cited

U.S. PATENT DOCUMENTS

| | | |
|---|---|---|
| 6,385,596 B1 | 5/2002 | Wiser et al. |
| 6,891,953 B1 | 5/2005 | DeMello et al. |
| 7,237,268 B2 * | 6/2007 | Fields .............................. 726/27 |
| 7,254,235 B2 | 8/2007 | Boudreault et al. |
| 7,266,839 B2 | 9/2007 | Bowers et al. |
| 7,343,014 B2 | 3/2008 | Sovio et al. |
| 7,526,650 B1 | 4/2009 | Wimmer |
| 7,567,987 B2 | 7/2009 | Shappell et al. |
| 7,720,767 B2 * | 5/2010 | Ta et al. .......................... 705/59 |
| 7,802,293 B2 * | 9/2010 | Boyer et al. ...................... 726/6 |
| 8,001,612 B1 | 8/2011 | Wieder |

(Continued)

FOREIGN PATENT DOCUMENTS

| | | |
|---|---|---|
| CN | 101006428 A | 7/2007 |
| EP | 1939781 A1 * | 7/2008 |

OTHER PUBLICATIONS

Cassella, Dena "Apple iTunes Cloud Coming in 2010, Says Robertson", Jan. 19, 2010, Digitaltrends.com, pp. 1-2.*

(Continued)

*Primary Examiner* — Christopher Revak
*Assistant Examiner* — Viral Lakhia
(74) *Attorney, Agent, or Firm* — Downey Brand LLP

(57) ABSTRACT

This is directed to providing access to content stored on a local cloud. In particular, a device can direct a librarian service overseeing the operation of a local cloud to provide another device with access to content stored on the local cloud. The librarian service can generate credentials for the other device, and provide the credentials to the other device. Using the credentials, the other device can connect directly to the local cloud and access the content. In addition, the local cloud can validate the credentials of the other before providing access to the content. The credentials can include, for example, a key to install or load on the device. The librarian may not require, however, the user to create credentials or register with the librarian before being permitted to access the content on the local cloud.

19 Claims, 10 Drawing Sheets

(56) References Cited

U.S. PATENT DOCUMENTS

| | | | |
|---|---|---|---|
| 8,074,290 B2 | 12/2011 | Nakano et al. | |
| 8,196,194 B2 | 6/2012 | Lindholm et al. | |
| 8,250,145 B2 | 8/2012 | Zuckerberg et al. | |
| 8,280,959 B1 | 10/2012 | Zuckerberg et al. | |
| 8,336,090 B2* | 12/2012 | Ache et al. | 726/9 |
| 8,402,555 B2 | 3/2013 | Grecia | |
| 8,473,429 B2* | 6/2013 | Cheng | G06F 17/30032 706/12 |
| 8,533,860 B1 | 9/2013 | Grecia | |
| 8,543,660 B2 | 9/2013 | Roberts et al. | |
| 8,549,300 B1 | 10/2013 | Kumar et al. | |
| 8,615,794 B1 | 12/2013 | Tomilson et al. | |
| 8,661,255 B2 | 2/2014 | Pedlow et al. | |
| 8,887,308 B2 | 11/2014 | Grecia | |
| 9,038,138 B2* | 5/2015 | Trammel | H04L 9/3213 713/187 |
| 9,160,720 B2 | 10/2015 | Pedlow et al. | |
| 2003/0097564 A1 | 5/2003 | Tewari et al. | |
| 2003/0182551 A1* | 9/2003 | Frantz et al. | 713/170 |
| 2003/0217267 A1 | 11/2003 | Kindberg | |
| 2005/0065891 A1 | 3/2005 | Lee et al. | |
| 2005/0066353 A1 | 3/2005 | Fransdonk | |
| 2005/0091507 A1 | 4/2005 | Lee et al. | |
| 2005/0283662 A1 | 12/2005 | Li et al. | |
| 2007/0266095 A1 | 11/2007 | Billsus et al. | |
| 2008/0010685 A1 | 1/2008 | Holtzman et al. | |
| 2008/0040283 A1* | 2/2008 | Morris | 705/59 |
| 2008/0077462 A1 | 3/2008 | Patel et al. | |
| 2008/0083025 A1* | 4/2008 | Meijer et al. | 726/9 |
| 2008/0091763 A1* | 4/2008 | Devonshire et al. | 709/201 |
| 2008/0134316 A1* | 6/2008 | Devonshire et al. | 726/15 |
| 2008/0313264 A1 | 12/2008 | Pestoni | |
| 2009/0083541 A1 | 3/2009 | Levine | |
| 2009/0100060 A1 | 4/2009 | Livnat et al. | |
| 2009/0249439 A1* | 10/2009 | Olden et al. | 726/1 |
| 2009/0293108 A1* | 11/2009 | Weeden | 726/6 |
| 2009/0304009 A1 | 12/2009 | Kolhi et al. | |
| 2009/0307361 A1* | 12/2009 | Issa et al. | 709/229 |
| 2010/0010944 A1* | 1/2010 | Cheng | G06F 17/30032 706/12 |
| 2010/0034389 A1 | 2/2010 | Sakharov | |
| 2010/0083351 A1* | 4/2010 | Ryder | 726/4 |
| 2010/0100899 A1 | 4/2010 | Bradbury et al. | |
| 2010/0185868 A1 | 7/2010 | Grecia | |
| 2010/0248698 A1* | 9/2010 | In | G06F 9/5072 455/414.1 |
| 2010/0257363 A1 | 10/2010 | Kiran et al. | |
| 2010/0325199 A1* | 12/2010 | Park et al. | 709/203 |
| 2010/0325422 A1* | 12/2010 | Gnanasambandam et al. | 713/153 |
| 2010/0332456 A1* | 12/2010 | Prahlad et al. | 707/664 |
| 2011/0016119 A1 | 1/2011 | Kodialam et al. | |
| 2011/0093941 A1* | 4/2011 | Liu et al. | 726/7 |
| 2011/0099382 A1 | 4/2011 | Grecia | |
| 2011/0099616 A1* | 4/2011 | Mazur et al. | 726/7 |
| 2011/0119738 A1 | 5/2011 | Piepenbrink et al. | |
| 2011/0154212 A1* | 6/2011 | Gharpure et al. | 715/738 |
| 2011/0208695 A1 | 8/2011 | Anand et al. | |
| 2011/0209064 A1* | 8/2011 | Jorgensen et al. | 715/733 |
| 2011/0225640 A1* | 9/2011 | Ganapathy et al. | 726/8 |
| 2011/0231660 A1 | 9/2011 | Kanungo | |
| 2011/0231670 A1* | 9/2011 | Shevchenko et al. | 713/189 |
| 2011/0265157 A1 | 10/2011 | Ryder | |
| 2011/0288946 A1 | 11/2011 | Baiya et al. | |
| 2011/0313898 A1 | 12/2011 | Singhal et al. | |
| 2011/0320345 A1 | 12/2011 | Taveau et al. | |
| 2012/0030318 A1* | 2/2012 | Ryder | H04L 67/1095 709/220 |
| 2012/0041829 A1 | 2/2012 | Rothschild et al. | |
| 2012/0042160 A1 | 2/2012 | Nakhjiri et al. | |
| 2012/0079095 A1 | 3/2012 | Evans et al. | |
| 2012/0079126 A1 | 3/2012 | Evans et al. | |
| 2012/0079276 A1 | 3/2012 | Evans et al. | |
| 2012/0079606 A1 | 3/2012 | Evans et al. | |
| 2012/0095871 A1 | 4/2012 | Dorsey et al. | |
| 2012/0095906 A1 | 4/2012 | Dorsey et al. | |
| 2012/0095916 A1 | 4/2012 | Dorsey et al. | |
| 2012/0096497 A1* | 4/2012 | Xiong | H04N 21/2747 725/50 |
| 2012/0102317 A1 | 4/2012 | Mathur et al. | |
| 2012/0102329 A1 | 4/2012 | Mittal et al. | |
| 2012/0130903 A1 | 5/2012 | Dorsey et al. | |
| 2012/0150727 A1 | 6/2012 | Nuzzi et al. | |
| 2012/0151220 A1 | 6/2012 | Grecia | |
| 2012/0166333 A1 | 6/2012 | von Behren et al. | |
| 2012/0166522 A1* | 6/2012 | MacLaurin | G06F 3/048 709/203 |
| 2012/0173333 A1 | 7/2012 | Berger | |
| 2012/0173431 A1 | 7/2012 | Ritchie et al. | |
| 2012/0173625 A1 | 7/2012 | Berger | |
| 2012/0180109 A1 | 7/2012 | Chen | |
| 2012/0191553 A1 | 7/2012 | Sathe et al. | |
| 2012/0239529 A1 | 9/2012 | Low et al. | |
| 2012/0254340 A1 | 10/2012 | Velummylum et al. | |
| 2012/0255033 A1 | 10/2012 | Dwivedi et al. | |
| 2012/0290376 A1 | 11/2012 | Dryer et al. | |
| 2012/0296741 A1 | 11/2012 | Dykes | |
| 2012/0310828 A1 | 12/2012 | Hu | |
| 2013/0007208 A1* | 1/2013 | Tsui et al. | 709/217 |
| 2013/0007892 A1 | 1/2013 | Inooka | |
| 2013/0145161 A1 | 6/2013 | Pedlow et al. | |
| 2013/0254115 A1 | 9/2013 | Pasa et al. | |
| 2013/0283364 A1* | 10/2013 | Chang | H04L 49/70 726/12 |
| 2013/0297504 A1 | 11/2013 | Nwokolo et al. | |
| 2013/0299596 A1 | 11/2013 | Choi et al. | |
| 2013/0332293 A1 | 12/2013 | Ran | |
| 2013/0346222 A1 | 12/2013 | Ran | |
| 2014/0019367 A1 | 1/2014 | Khan et al. | |
| 2014/0089196 A1 | 3/2014 | Paya et al. | |
| 2014/0090081 A1 | 3/2014 | Mattsson et al. | |
| 2014/0099886 A1 | 4/2014 | Monroe | |
| 2014/0181525 A1 | 6/2014 | Pedlow et al. | |
| 2014/0189799 A1 | 7/2014 | Lu | |
| 2014/0196115 A1 | 7/2014 | Pelykh | |
| 2014/0214664 A1 | 7/2014 | Kim et al. | |
| 2014/0245411 A1 | 8/2014 | Meng et al. | |
| 2014/0279566 A1 | 9/2014 | Verma et al. | |
| 2014/0304778 A1 | 10/2014 | Grecia | |
| 2014/0331060 A1 | 11/2014 | Hayton | |
| 2015/0150110 A1 | 5/2015 | Canning et al. | |
| 2015/0254441 A1 | 9/2015 | Sanso | |
| 2015/0304268 A1 | 10/2015 | Byttow et al. | |

OTHER PUBLICATIONS

Landau, Ted "Confused about iTunes Home Sharing?", Oct. 15, 2009, the Mac Observer, pp. 1-3.*

Kortina, Jenny "How-To: One iTunes Library With Multiple Computers", Oct. 13, 2008, gigaom.com, pp. 1-2.*

Text reproduction of the article entitled "How-To: One iTunes Library With Multiple Computers" by Jenny Kortina, Oct. 13, 2008, pp. 1-5.*

Simon L. Garfinkel, "Email-Based Identification and Authentication: An Alternative to PKI?", IEEE Security & Privacy, http://computer.org/security/, published Nov. 2003, pp. 20-26.

PCT Application No. PCT/US2011/030329—International Search Report and Written Opinion dated Jul. 22, 2011.

PCT Application No. PCT/US2011/030329—Written Opinion of the International Preliminary Examining Authority dated Apr. 4, 2012.

PCT Application No. PCT/US2011/030329—International Preliminary Report on Patentability dated Jun. 27, 2012.

Australian Patent Application No. 2011243089—Patent Examination Report No. 1 dated Sep. 11, 2013.

P. Mell and T. Grance, "The NIST Definition of Cloud Computing", Version 15, Oct. 7, 2009, pp. 1-2.

"STR3AM Digital Distribution System." Amazon Web Services, 3 pp.

"STR3AM Specifications—what's new in version 2.3.2" cnet Download.com, 1 p. 2012.

Petition for Inter Partes Review, U.S. Pat. No. 8,402,555, 65 pages.

* cited by examiner

ONE STEP SECURITY SYSTEM IN A NETWORK STORAGE SYSTEM

FIELD

This is directed to providing access to restricted content stored in a network storage system using a single step process. In particular, this is directed to providing an instruction to share content stored on a network storage system with another device, and automatically providing credentials to the other device.

BACKGROUND

With the increased availability of high speed Internet connections, many devices have the ability to connect to remote services or sources. In addition, as the cost of high speed Internet connections decreases, many users may maintain a constant or near constant connection to the Internet. Furthermore, as wireless communications systems expand, users can connect to remote sources at many different locations, including far from the user's work, home or other areas where the user typically can access the Internet. For example, wireless communications networks have expanded to the point where a device can connect to the Internet on a mountaintop in nature (e.g., while skiing or hiking).

Because of the enhanced ability of devices to connect to the Internet as a user moves or travels, a user can make an increased use of remote storage. In particular, a user can store information in one or more remote locations, while knowing that the information can remain accessible so long as the user has an Internet connection available. This can allow a user to expand the amount of storage available to the user beyond the actual storage within the device (e.g., the storage of a hard drive or solid state drive in a device).

A device can connect to any suitable remote storage source to store or access content. In some embodiments, one or more cloud storage solutions can be available to a user. A cloud storage solution can typically include one or more racks of storage devices geographically located in one area and connected to each other and to the Internet. The storage devices can be managed by a system administrator, who ensures that all of the storage devices operate properly, run appropriate profiles, and manages the storage of information by users on the cloud storage. While such cloud storage may be of use to a user, it may also come at a cost. In particular, the cloud provider can charge a monthly or other recurring fee in exchange for use of the cloud storage. In addition, the cost of operating a cloud storage system can include not only material costs (e.g., storage devices) but also network administration costs. In particular, each time a user wishes to provide access to restricted content to another user, an administrator may be required to generate and provide the credentials to the other user, and to release access to the restricted content for the generated credentials. This can require both time and administrator resources.

SUMMARY

This is directed to systems, methods and computer-readable media for providing access to content stored on a local network storage system (e.g., a local cloud) using a single step. In particular, this is directed to providing access to content stored on a local cloud that includes devices identified by a user and administrated by a device providing a librarian service.

A user can define a local cloud by selecting a list of devices controlled by the user to include in a cloud. The devices in the list can identify themselves and their owner to a librarian, which can allocate resources of the identified devices for the local cloud. In addition, the user can elect to trust one or more other users, whose devices can also be made available for a cloud. The librarian can select a set of devices to combine to form a local cloud, where the devices are owned by one or more users.

In some cases, a user may wish to give another user access to content on the local cloud. For example, a user may wish to share an image, audio, video, or other content for review or editing (e.g., a group project). As another example, a user may wish to give another person access to some or all of the local cloud (e.g., a directory and sub-directory, content associated with a particular tag, or any content associated with selected metadata). To do so, the user can provide an instruction to the librarian identifying the content or local cloud to share, and the other person with which to share the content or local cloud. For example, the user can identify a particular file or directory, and an email address associated with the other user.

In response to receiving the instruction, the librarian can determine whether the user or email address is known to it. For example, the librarian can determine whether the target user has provided devices for use in a local cloud, or whether the user has already been provided with access to content on another local cloud. If the librarian determines that the user is new, the librarian can generate credentials (e.g., a key) for the user. In addition, the librarian can generate a link via which the other user can access the content. For example, the link can be a shortcut for connecting to the local cloud. As another example, the link can include a shortcut for operating a particular application used to view the shared content. In some embodiments, the link can be tied to the credential, such that installing the credential also provides a selection of the link. The librarian can transmit the link, with the credential (e.g., if newly generated or requested) to the other user (e.g., using the email address provided for the other user).

The librarian can update one or more access control lists associated with the local cloud or content to include the identified user. Alternatively, the librarian can receive, from a user, an indication of the devices to which the user wants to grant access, and can grant access to those devices in response to the user indication. In some embodiments, the librarian can revise or edit a database from which local network information is pulled by each device or user managed by the librarian to indicate that the other user has access to the local cloud. Alternatively, each device in a local cloud can be initially informed by the librarian of the other users authorized to access content on the device. The device can then notify the librarian of the authorized users. This may allow the other user to see the shared content or local cloud appear as available to the user's device even if the user does not receive or select the link provided in the communication from the librarian.

Using an electronic device, the other user can operate an application used to access the content or directory in the local cloud, and access the content. For example, the electronic device of the other can request, from the librarian, information regarding the location of devices forming a local cloud associated with the other user, and receive automatically from the librarian information for connecting to the shared content in addition to the other user's local cloud. This approach may allow the other user to seamlessly and rapidly connect to other users' local clouds without requiring burdensome credential generating or credential entering steps on the part of the other user when the other user is new to the librarian.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to providing access to restricted content stored on a network storage source to another device. In particular, this is directed to a one-step process for providing access to restricted content.

Figure 1:
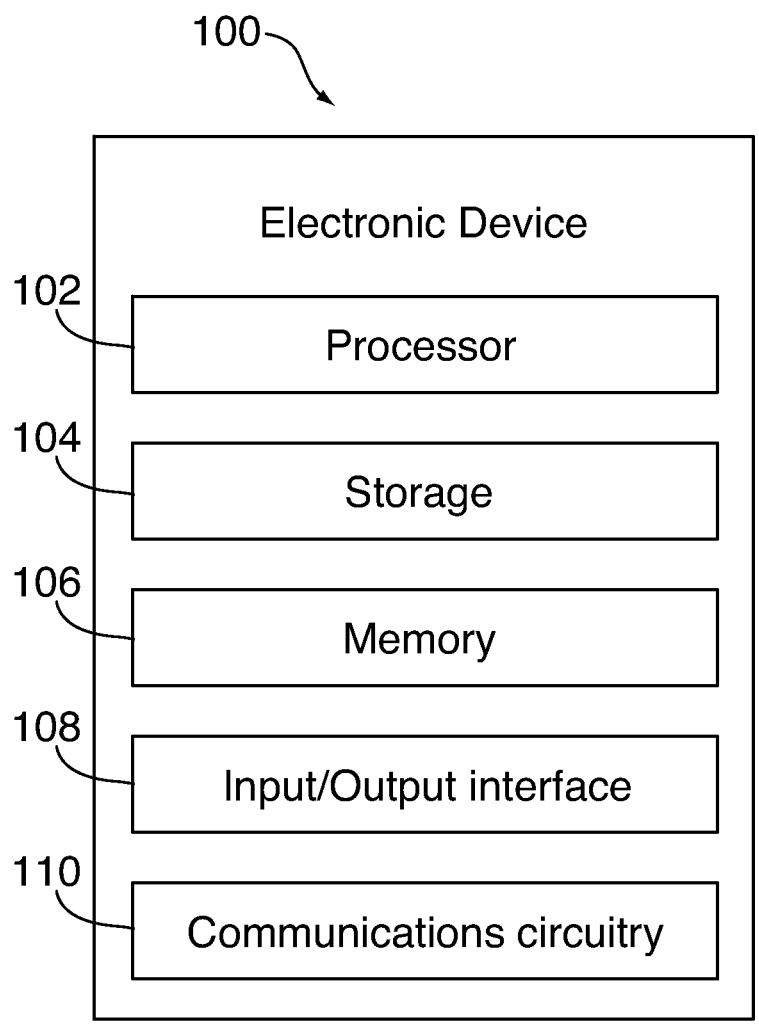
FIG. 1 is a schematic view of an illustrative electronic device for use in a network storage system in accordance with one embodiment of the invention.

FIG. 1 is a schematic view of an illustrative electronic device for use in a network storage system in accordance with one embodiment of the invention. Electronic device 100 can include any suitable type of electronic device operative to connect to a network storage system or to be used as part of a network storage system. For example, electronic device 100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a music recorder, a video recorder, a gaming device, a camera, radios, medical equipment, and any other portable electronic device having a display from which a user can select a portion of displayed objects.

Electronic device 100 can include a processor or control circuitry 102, storage 104, memory 106, input/output circuitry 108, and communications circuitry 110 as typically found in an electronic device of the type of electronic device 100, and operative to enable any of the uses expected from an electronic device of the type of electronic device 100 (e.g., connect to a host device for power or data transfers). In some embodiments, one or more of electronic device components 100 can be combined or omitted (e.g., combine storage 104 and memory 106), electronic device 100 can include other components not combined or included in those shown in FIG. 1 (e.g., a sensor array or positioning circuitry), or electronic device 100 can include several instances of the components shown in FIG. 1. For the sake of simplicity, only one of each of the components is shown in FIG. 1.

Control circuitry 102 can include any processing circuitry or processor operative to control the operations and performance of electronic device 100. Storage 104 can include, for example, one or more storage mediums including a hard-drive, solid state drive, flash memory, permanent memory such as ROM, any other suitable type of storage component, or any combination thereof. Memory 106 can include cache memory, semi-permanent memory such as RAM, and/or one or more different types of memory used for temporarily storing data. In some embodiments, memory 106 and storage 104 can be combined as a single storage medium. Input/output circuitry 108 can be operative to convert (and encode/decode, if necessary) analog signals and other signals into digital data.

Input/output interface 108 can convert (and encode/decode, if necessary) analog signals and other signals into digital data. For example, input/output interface 108 may receive and convert physical contact inputs (e.g., from a multi-touch screen or a button press), physical movements (e.g., from a mouse or sensor), analog audio signals (e.g., from a microphone), or any other input provided by a user. Although input/output interface 108 is illustrated in FIG. 1 as a single component of electronic device 100, several instances of input/output interface 108 can be included in electronic device 100.

Electronic device 100 can include any suitable mechanism, circuitry or component for allowing a user to provide inputs to input/output interface 108. For example, electronic device 100 may include a button, keypad, dial, a click wheel, or a touch interface (e.g., a capacitive touch screen), or combination of these. In some embodiments, input/output information 108 can instead or in addition include circuitry, software, firmware, or other components for detecting and processing voice inputs or other audio inputs. In some cases, input/output interface 108 can be operative to detect and process inputs received from gestures of the device (e.g., inputs detected from movements of the device, such as shaking, twisting or spinning).

Electronic device 100 can include specialized output interface associated with output signals such as, for example, one or more audio or visual outputs. An audio output may include one or more speakers (e.g., mono or stereo speakers) built into electronic device 100, or an audio component that is remotely coupled to electronic device 100 (e.g., a headset, headphones or earbuds that may be coupled to communications device with a wire or wirelessly). A visual output can include display circuitry (e.g., a screen or projection system) for providing a display visible to the user. For example, the display circuitry can include a screen (e.g., an LCD screen) that is incorporated in electronics device 100, a movable display or a projecting system for providing a display of content on a surface remote from electronic device 100 (e.g., a video projector), or combinations of these. In some embodiments, input/output interface 108 can include a coder/decoder (Codec) to convert digital media data into analog signals such as, for example, video Codecs, audio Codecs, or any other suitable type of Codec.

Communications circuitry 110 may be operative to communicate with other devices or with one or more servers using any suitable communications protocol. Electronic device 100 may include one more instances of communications circuitry for simultaneously performing several communications operations using different communications networks. For example, communications circuitry may support Wi-Fi (e.g., a 802.11 protocol), Ethernet, Bluetooth™ (which is a trademark owned by Bluetooth Sig, Inc.), radio frequency systems, cellular networks (e.g., GSM, AMPS, GPRS, CDMA, EV-DO, EDGE, 1GSM, DECT, IS-136/TDMA, iDen, LTE or any other suitable cellular network or protocol), infrared, TCP/IP (e.g., any of the protocols used in each of the TCP/IP layers), HTTP, FTP, RTP, RTSP, SSH, Voice over IP (VOIP), any other communications protocol, or any combination thereof. In some embodiments, communications circuitry 110 may include one or more communications ports operative to provide a wired communications link between electronic device 100 and a host device. For example, a portable electronic device may include one or more connectors (e.g., 10 pin connectors or USB connectors) operative to receive a cable coupling the portable electronic device to a host computer. Using software on the host computer (e.g. iTunes available from Apple Inc.), the portable electronic device may communicate with the host computer.

In some embodiments, electronic device 100 can include a device having a limited interface. For example, electronic device 100 can serve as a storage node for a network storage system. In particular, electronic device 100 can be limited to a device having storage capabilities, and communications circuitry to connect the electronic device to a communications network. The device may not include an integrated input interface, but may instead be remotely accessed by another device (e.g., over a wired or wireless communications path).

Figure 2:
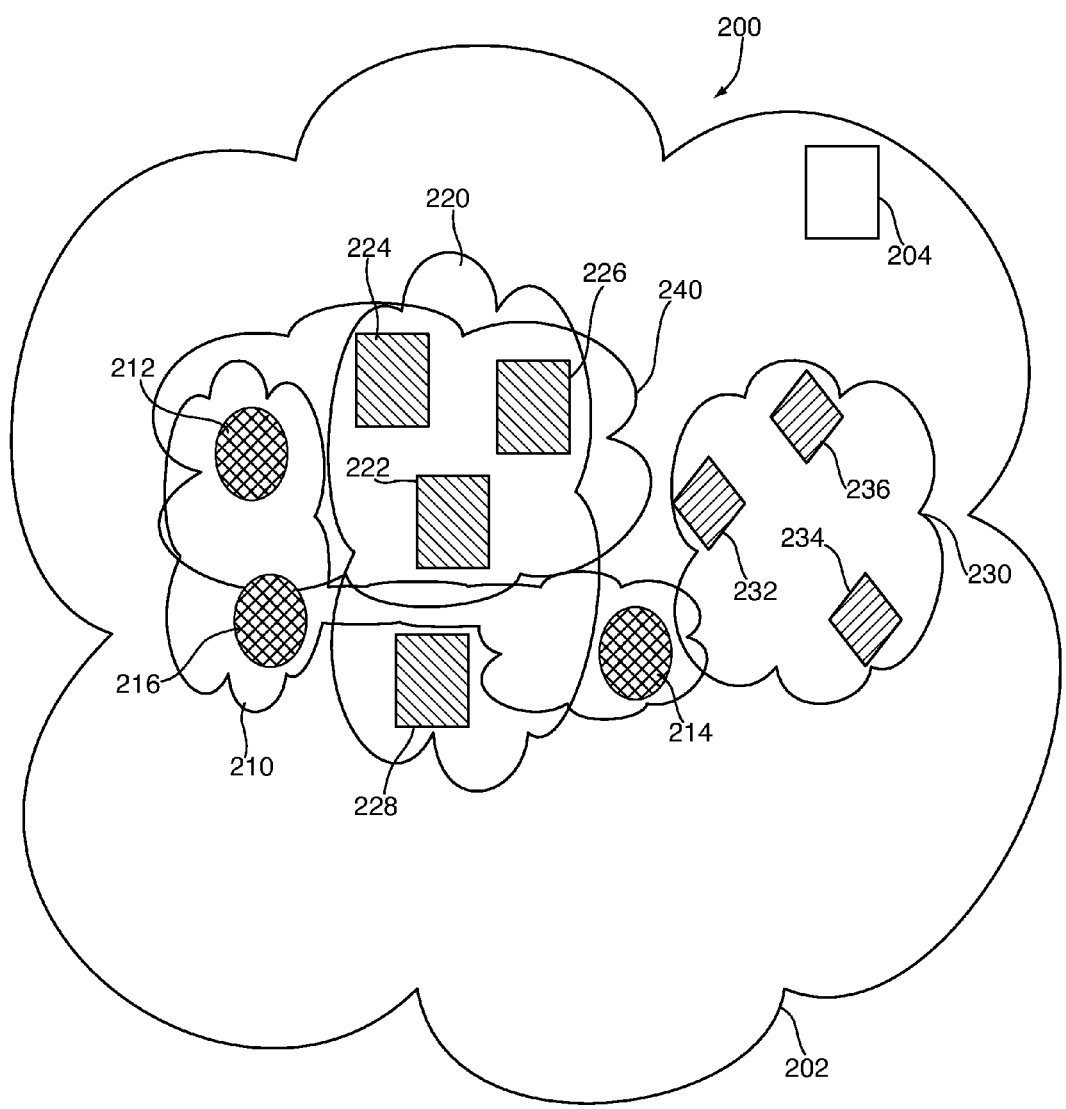
FIG. 2 is a schematic view of an illustrative networked system in accordance with one embodiment of the invention.

Several electronic devices, including electronic devices having some or all of the same features, can be connected to each other to form a network over which information can be shared. In particular, a user may own several devices that are interconnected to share information or to store information that can be accessed from any of the devices. FIG. 2 is a schematic view of an illustrative networked system in accordance with one embodiment of the invention. System 200 can include electronic devices 212, 214 and 216 associated with a first user, devices 222, 224, 226 and 228 associated with a second user, and devices 232, 234 and 236 associated with a third user. It will be understood, however, that system 200 can include any suitable number of devices associated with any suitable number of users. Each of the devices associated with particular users can be connected in a personal network. For example, network 210 can include the devices associated with the first user, network 220 can include the devices associated with the second user, and network 230 can include the devices associated with the third user. Each of the networks can be secured, such that information can be shared between devices on a network, but not accessed from other devices outside of the network.

In some embodiments, some or all of the devices can be connected to a communications network that allows the interconnection of all of the devices. For example, the devices shown in FIG. 2 can be connected to global communications network 202 (e.g., the Internet). Each device can connect directly to the communications network (e.g., via communications circuitry connected to an access point for the communications network), or via an intermediary device (e.g., connect to the communications network by connecting to a device having an access point for the intermediary device). Using communications network 202, devices that are part of individual communications networks can communicate across several individual networks.

In some embodiments, different users can elect to share resources to form a communications network that spans several individual communications networks. For example, the first user can elect to trust the second user, and vice versa. Each user can allocate some of the user's devices for the shared communications network. For example, the first and second users can connect devices 212, 222, 224 and 226 to form communications network 240. The devices can communicate over communications network 202, using one or more authentication and encryption protocols.

One or more users can combine to form a local or personal networked storage system (e.g., local cloud) using any suitable approach. In some embodiments, several users can each own one or more devices that can be connected to network 202. To form a networked storage system that can be remotely accessed, and to take advantage of distributed storage available from each of the devices, each of the several users can contribute one or more devices, or resources from one or more devices (e.g., storage or processing capabilities).

The different devices associated with each user can be incorporated in the local cloud using any suitable approach. In some embodiments, each user can elect one or more specific users with which to form a local cloud. The user can identify those users to a control system, for example a librarian service operating on a master device of network 202. The master device can include any suitable feature or component, including for example one or more components described in connection with device 100 (FIG. 1). In some embodiments, network 202 can include a localized server 204 provided by a service provider on which a librarian service is operating. The librarian can receive, from each user having a device in network 202, an indication of the resources from one or more devices provided by the user for a local cloud, and one or more other users that the device trusts to be part of a local cloud. The system can then assign different nodes to different local clouds, as determined by the needs of each user. In some embodiments, the particular devices used in each local cloud can vary, and the librarian can manage a map of the devices are used in locals cloud requested by different users.

Figure 3:
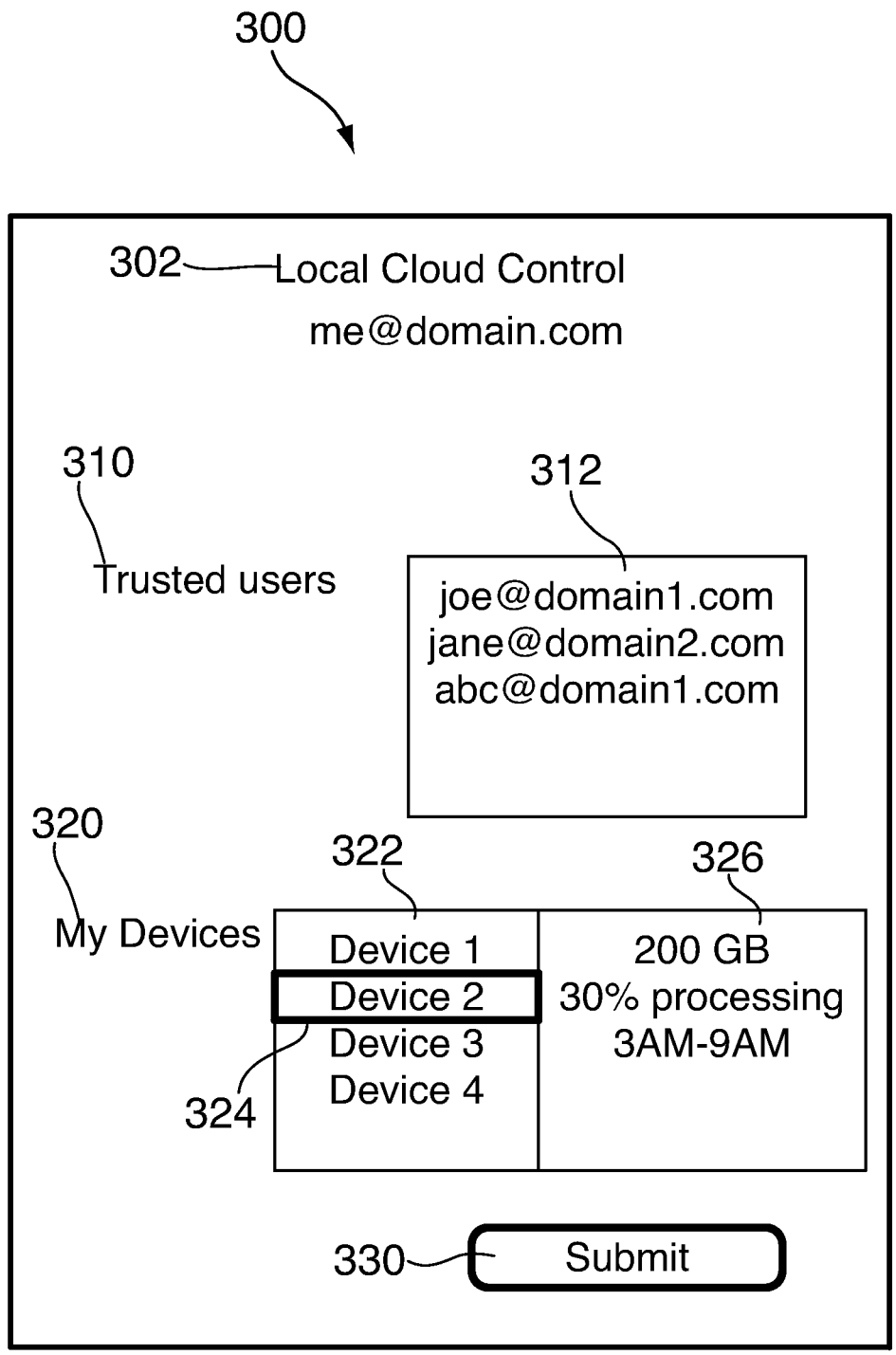
FIG. 3 is a schematic display of an interface for providing information regarding trusted devices and available device resources to a librarian in accordance with one embodiment of the invention.

FIG. 3 is a schematic display of an interface for providing information regarding trusted devices and available device resources to a librarian in accordance with one embodiment of the invention. Display 300 can include title 302 indicating that the display corresponds to a local cloud setup page. In particular, display 300 corresponds to the distribution of the user's assets and resources within a local cloud. The user can identify one or more specific other users that the user trusts, and with which the user agrees to share resources. For example, display 300 can include identifying field 310 corresponding to box 312 into which the user can identify trusted other users. The other users can be identified using any suitable approach, including for example from an e-mail address or other identifying information provided or known to the librarian. In some embodiments, the owning user's identity (for the librarian) can be provided, for example in the vicinity of title 302.

In some embodiments, the user can (e.g., using display 300) indicate the specific resources 320 of the user that the user is willing to dedicate to a local network storage system. For example, the user can list, in box 322, the individual devices associated with that user. In some embodiments, one or more of the devices can be automatically identified by the librarian, or by the device providing display 300. For example, the device used by the user can detect the other devices in the network associated with the user's devices. The user can select a particular device using highlight region 324, and provide, in box 326, device resources for the selected particular device to make available for a local network storage system. The user can select any suitable resource, including for example storage (e.g., in a percentage or numerical amount), processing resources (e.g., percentage of clock cycles), or combinations of these. In some embodiments, the user can define one or more limitations to the shared resources, such as time constraints, restrictions based on the resources used or required by a user, connection speed, resource cost, or combinations of these. Once a user has specified one or more trusted users and allocated devices, the user can provide an instruction to transmit the information to the librarian (e.g., select submit option 330).

A user can form a local network storage system (e.g., a personal or local cloud) using any suitable approach. In some embodiments, a user can provide a request to the librarian for a local cloud. The user request can include any suitable criteria or requirement, including for example a storage requirement (e.g., at least 1 TB). In response to receiving a request, the librarian can identify all devices meeting the request's criteria that the requesting user trusts, and that in turn also trust the requesting user that. The librarian can identify the devices associated with each of the users that were made available for networked storage. The system can then select some or all of the devices to form a new local cloud for the requesting user. In particular, the devices can communicate amongst themselves and share information (e.g., share services and data). In some cases, the librarian can maintain a map of the devices used in each local cloud, and provide the listing of devices and addresses to any device requesting to retrieve or access a local cloud that the device is authorized to access. In some cases, one or more devices made available to any one user can be used in several other users' local clouds. For example, the owner of a device can request a local cloud, and another user trusting and trusted by the owner of the device can also request a local cloud that makes use of the device. Information corresponding to each cloud can be encrypted and distinguished to ensure that only an appropriate or authorized user can access information stored by the device.

Figure 4:
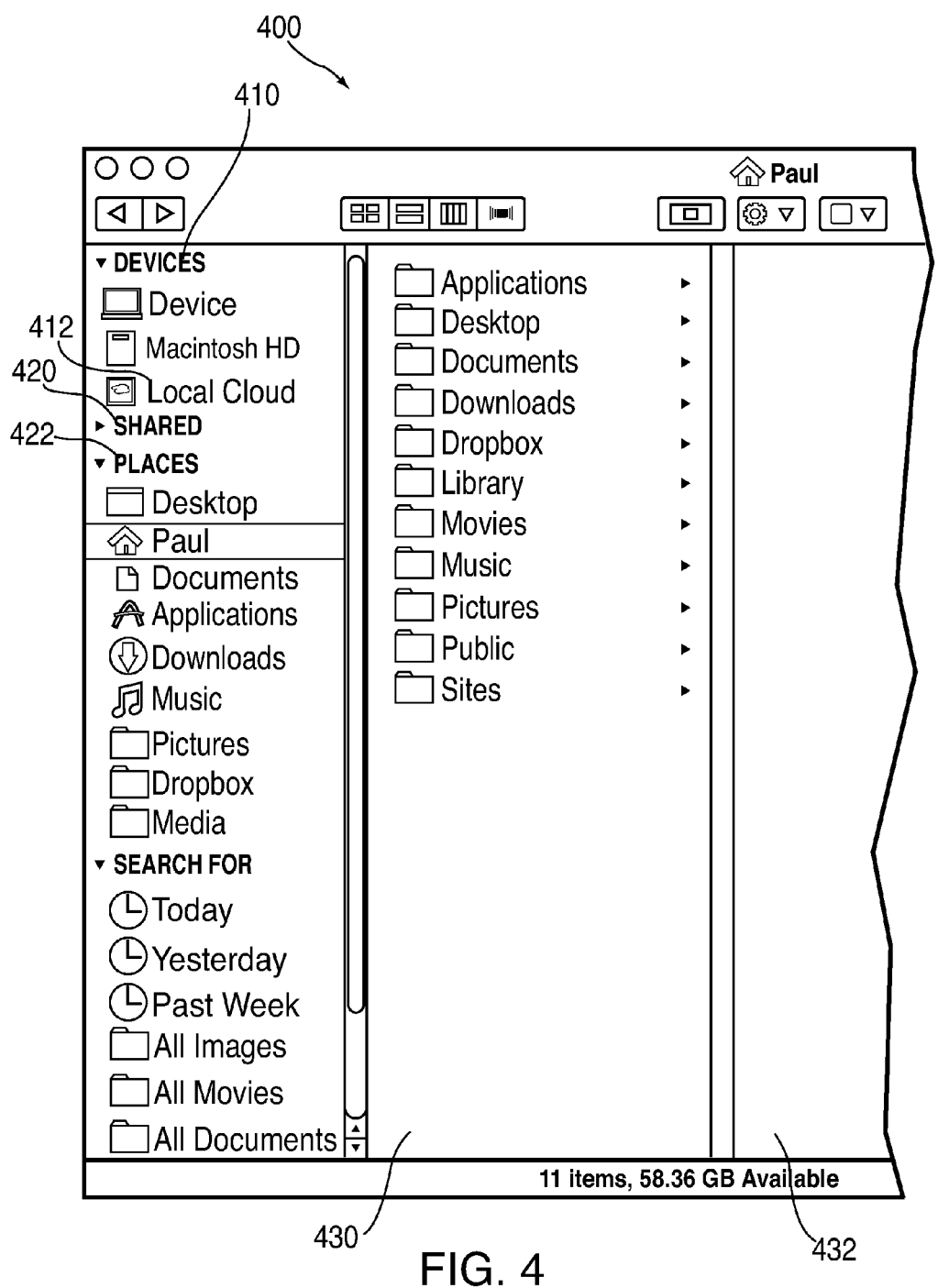
FIG. 4 is a schematic view of an interface for connecting to a local cloud in accordance with one embodiment of the invention.

An electronic device connected to a local cloud can provide any suitable interface for accessing the cloud (e.g., to read or write content). For example, the cloud can appear with a listing of other drives or storage resources of a device. FIG. 4 is a schematic view of an interface for connecting to a local cloud in accordance with one embodiment of the invention. Display 400 can include several columns for navigating a tree structure in which data is stored. Display 400 can include devices listing 410 in which available devices can be listed. For example, listing 410 can include the user's device and local drive, and an option 412 for the local cloud. The user can select an option from listing 410 to access the corresponding stored content. In some embodiments, the option for the local cloud can be included in a different region of display 400. For example, the local cloud option can be included in device section 420 or places section 422. In response to receiving a selection of option 412, display 400 can provide an indication of the data structure of the local cloud in columns 430 and 432. In some cases, display 400 can instead or in addition providing a listing of the content stored in the cloud in one of columns 430 and 432.

Figure 5:
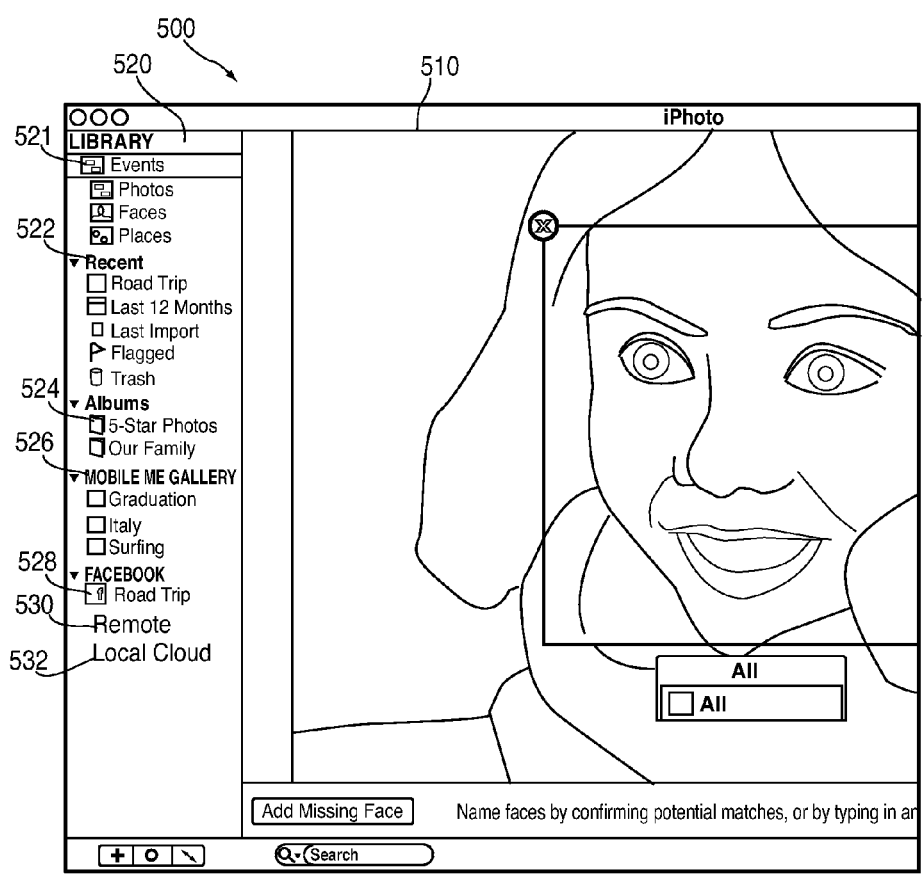
FIG. 5 is a schematic view of an illustrative display for viewing images stored in a local cloud using a photo application in accordance with one embodiment of the invention.

In some embodiments, a user can instead or in addition store or access content on a local cloud from an application corresponding to the stored or accessed content. For example, a user can access images stored in a local cloud from a photo application. FIG. 5 is a schematic view of an illustrative display for viewing images stored in a local cloud using a photo application in accordance with one embodiment of the invention. Display 500 can include display region 510 in which one or more images can be displayed. The user can select a source or collection of images to display in region 510 from sources column 521. Display 500 can include any suitable source for or collection of images, including for example library option 521, recent option 522, albums option 524, mobile me gallery 526, and facebook option 528 (or any other social network option). In some embodiments, column 521 can include remote option 530 in which local cloud 532 can be listed. If the user has been invited to view images from another user, an option for a local cloud associated with the other user can be displayed near remote option 530.

Figure 6:
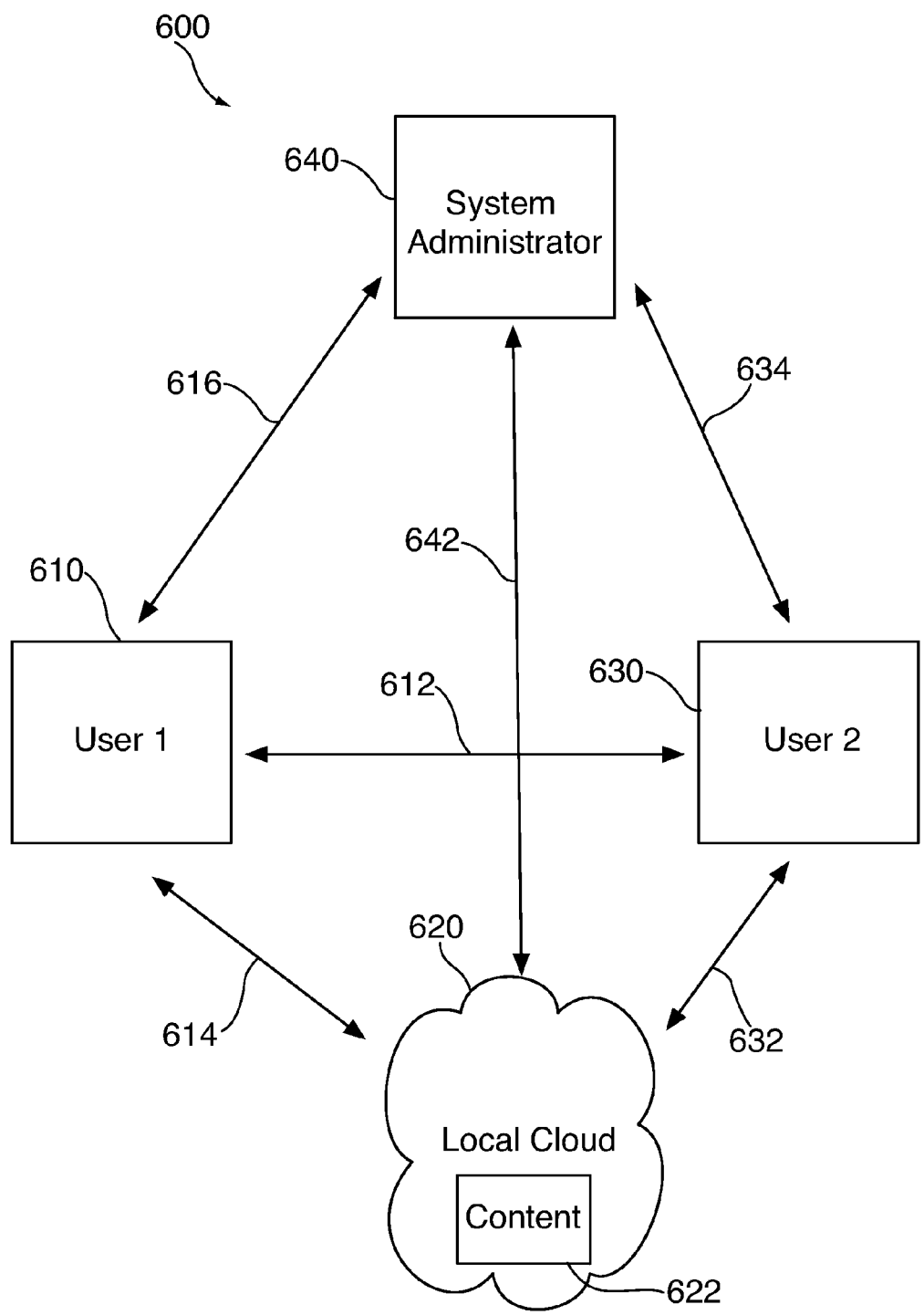
FIG. 6 is a schematic view of approaches for providing credentials to another user for accessing content on a local cloud.

In some embodiments, a user may wish to share content stored on a local cloud with another user. In particular, a user may wish to share content with another user who is not trusted by the user, and whose devices are not used in the user's local cloud. As another example, a user may wish to share content with another user who has provided devices used as part of the user's local cloud, but for whom access has been restricted. The user can allow the other user any suitable access rights for the user-owned content stored in the local cloud, including for example one or more of read, write, and view rights. The user can use any suitable approach to provide access to the content stored on the local cloud. FIG. 6 is a schematic view of approaches for providing credentials to another user for accessing content on a local cloud. System 600 can include several components connected via a global network (e.g., the Internet). For example, system 600 can include first device 610 wishing to give second device 630 access to content 622 stored on local cloud 620. For the sake of simplicity, the concepts of a second device and another user can be used interchangeably. In a first approach, first device 610 can generate credentials for second device 620. The credentials can take any suitable form, including for example a username and password combination, a key, a certificate, or combinations of these. First device 610 can provide the credentials using any other suitable approach over any suitable communications path, including for example path 612. In some embodiments, first device 610 can send the credentials via e-mail, text message (e.g., SMS or MMS), telephone call, in person meeting, or combinations of these. First device 610 can in addition provide the generated credentials to local cloud 620 so that the local cloud can authorize second device 630 to access the content. The first device can provide the credentials over any suitable communications path, including for example communications path 614. Communications path 614 can be part of the general network (e.g., the Internet), or a path within local cloud 620.

Once second device 630 has received the credentials, the second device can provide confirmation of receipt of the credentials to first device 610, and can access content 622 from local cloud 620. For example, second device 630 can provide the confirmation via communications path 612. The second device can access content 622 over communications path 632, which can include a communications path provided by one or both of a general network (e.g., the Internet) or local cloud 620.

In some embodiments, local cloud 620 can be administered by a system administrator. The system administrator can include a person operating the network, software operating on a server, or combinations of these. In such systems, first device 610 can instead or in addition indicate to system administrator 640 that the devices wishes to allow second device 630 access to content 622 on local cloud 620. For example, first device 610 can send the indication to system administrator 640 via communications path 616. Communications path 616 can, in some embodiments, include some or all of the features of communications path 612 or path 614.

In response to receiving the request, system administrator 640 can generate credentials for second device 630, and transmit the generated credentials to the device over communications path 634. The credentials can take any suitable form, including one or more of the forms described above. The credentials can be communicated using any suitable approach, including for example one or more of the approaches described above. In some embodiments, system administrator 640 can instead or in addition direct second device 630 to connect to the system administrator to register and create credentials. For example, system administrator 640 can direct a user of second device 630 to create an account with a username and password entered by the user.

Once the system administrator has generated or received the credentials from second device 630, the system administrator can transmit the credentials to local cloud 620 with instructions to allow access to content 622 to a device providing the credentials. The system administrator can provide the credentials and instructions using any suitable approach, including for example over communications path 642, which can include some or all of the features of the communications paths described above. Second device 630 can retrieve the credentials provided by system administrator 640, and connect to local cloud 620 to access content 622.

Figure 7:
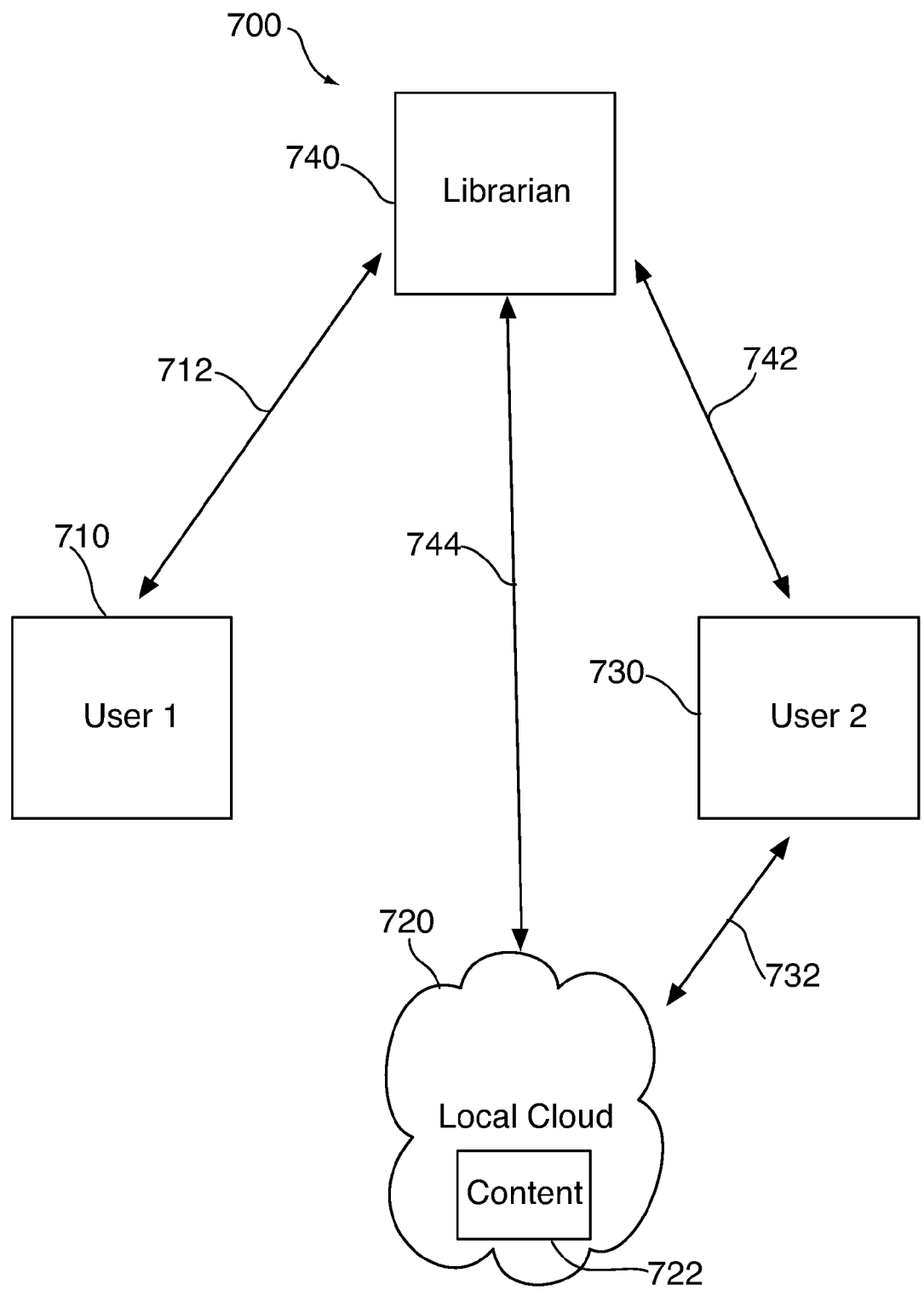
FIG. 7 is a schematic view of a system for sharing content stored on a local cloud in accordance with one embodiment of the invention.

While these approaches may provided the desired final result (i.e., the second device has access to the content owned by the first device and stored in the local cloud), these approaches require several steps and actions by several users. In addition, a time cost is associated with each of these steps. In some embodiments, the number of steps and time costs can be reduced by leveraging the librarian overseeing the local cloud. FIG. 7 is a schematic view of a system for sharing content stored on a local cloud in accordance with one embodiment of the invention. System 700 can include first device 710 wishing to share content 722 stored on local cloud 720 with second device 730. The particular devices forming local cloud 720 can be selected and overseen by librarian 740, which can be in contact with all devices forming local cloud 720. In particular, the devices can be associated with users that trust each other, such that trust between users is extended to the devices owned by the users.

To share content 722 with second device 730, first device 710 (or the user of first device 710) can add the user of second device 730 (or second device 730) to an internal trust list. First device 710 can then tell librarian 740 of this expansion to the trust list. In some embodiments, the first device can instead or in addition send an instruction (e.g., a globally unique identifier for second device 730, such as an email address), to librarian 740. In some embodiments, the instruction can identify one or more instances of content to share, although the content can be identified when the user of the second device contacts the first device. Alternatively, the instruction can identify one or more local clouds associated with the user of first device 710. In some embodiments, the instruction can specify the access rights of second device 730. For example, the instruction can specify read and write access rights.

First device 710 can provide the instruction or revised trust list to librarian 740 over any suitable communications path, including for example communications path 712. Communications path 712 can include, for example, a communications path over a general network to which both first device 710 and librarian 740 are connected (e.g., the Internet). As another example, communications path 712 can be entirely or partially be within local cloud 720.

In response to receiving the instruction, librarian 740 can generate credentials for second device 730, for the user of second device 730, or both. For example, librarian 740 can generate credentials for second device 730 in response to receiving an instruction from the user of first device 710. As another example, librarian 740 can generate credentials for second device 730 in response to receiving a request from the second device. In some embodiments, librarian 740 can initially determine whether second device 730 (or the user of second device) is known to the local cloud system (e.g., known to the librarian). For example, the librarian can determine whether the user of the second device has trusted other devices, or whether the second device has been provided to the librarian as an available device for a local cloud for one or more users. As another example, the librarian can determine whether the user of the second device has previously been granted access to content on one or more local clouds. If the electronic device determines that the second device or the user is new to the librarian, the librarian can generate credentials associated with the second device, the user or both. As another example, the librarian can generate a certificate or key associated with the second device, a certificate or key associated with the user of the second device, or both.

If the second device (and its user) is known to the librarian, the librarian can instead or in addition associate content 722 with the known credentials of the second device and user, and provide the credentials to first device 710. Because the user of first device 710 trusts the user of second device 730, or grants access content 722 to the user of second device 730, first device 710 can automatically enable second device 730, which has the known credentials of the user of second device 730, to access content 722.

Librarian 740 can provide the generated credentials to the user of second device 730 over communications path 742. For example, librarian 740 can send an email to the user of second device 730 (e.g., using the identifying email provided in the instruction from first device 710) in which the generated credentials are included. For example, credentials can be incorporated in the body of a message (e.g., an email body). As another example, the credentials can be attached to the message (e.g., an email attachment). In some embodiments, librarian 740 can instead or in addition send a link to the shared content (e.g., a link to content 722). For example, the librarian can send a coded instruction directing the user of second device 730 to open an application associated with content 722, and access the local cloud on which the content is stored. As another example, the librarian can send a link to connect to the local cloud.

If the user of second device 730 was previously known to the librarian, the librarian can assume that second device 730 already has the credentials installed, and instead or in addition only provide a link to content 722 or to local cloud 720. When electronic device 730 contacts librarian 740 to ask for local clouds available to the user of second device 730, the librarian can return a listing of clouds or devices that includes device 710 and content 722. Alternatively, the librarian can instead or in addition send local cloud 720 an instruction to allow second device 730, or a device having the credentials associated with second device 730 (e.g., the device of the user of second device 730) access to content 722. The librarian can provide the information or instruction over communications path 744, which can include some or all of the features of the communications paths described above.

In response to receiving the credentials, link, or both from the librarian, second device 730 can connect to local cloud 720 to access content 722. For example, a user of second device 730 can select the link to open an application or window for connecting to local cloud 720, for example creating communications path 732 that can have some or all of the features of the communications paths described above. As another example, when second device 730 contacts librarian 740 (e.g., to retrieve existing local clouds associated with or available to second device 730), the librarian can provide addressing information for second device 730 to automatically connect to local cloud 720 and add content 722 to an application window. In particular, if content 722 is an image, second device 740 can automatically connect to local cloud 720 and identify the local cloud and content in a "local cloud" or "remote" region of an image application display (e.g., display 500, FIG. 5). Second device 740 can automatically connect to local cloud 740 without requiring the user to select the link in the communication from the librarian.

In cases where the second device is new to the librarian, the second device may be required to select and install the credentials before accessing content 722. For example, a user can select the credentials, which can automatically install and seamlessly open an application for accessing content 722. The credentials can be stored using any suitable approach, for example in a credential store associated with a networking process or local cloud process (e.g., in communication with librarian 740).

Accordingly, using this approach, the first device only requires a single step—viz., instructing the librarian to give access to the content to the second user—for the second user to get access. In addition, the second user does not need to perform any step, if credentials have been previously installed, to access the content. In fact, the second device does not even need to be made aware of the availability of the content from the librarian, as the second device can automatically connect to or be made aware of the local cloud on which the content is stored (e.g., receive addressing information for the local cloud from the librarian, or automatically include the first device in a local cloud of the second device). Once connected, the second device can provide the available content on an appropriate field. Furthermore, because the librarian does not require any user interaction (e.g., by a system administrator), the process can be very fast (e.g., less than 500 ms between the time the first device indicates that a second user can access content to when the second user can access the content).

Figure 8:
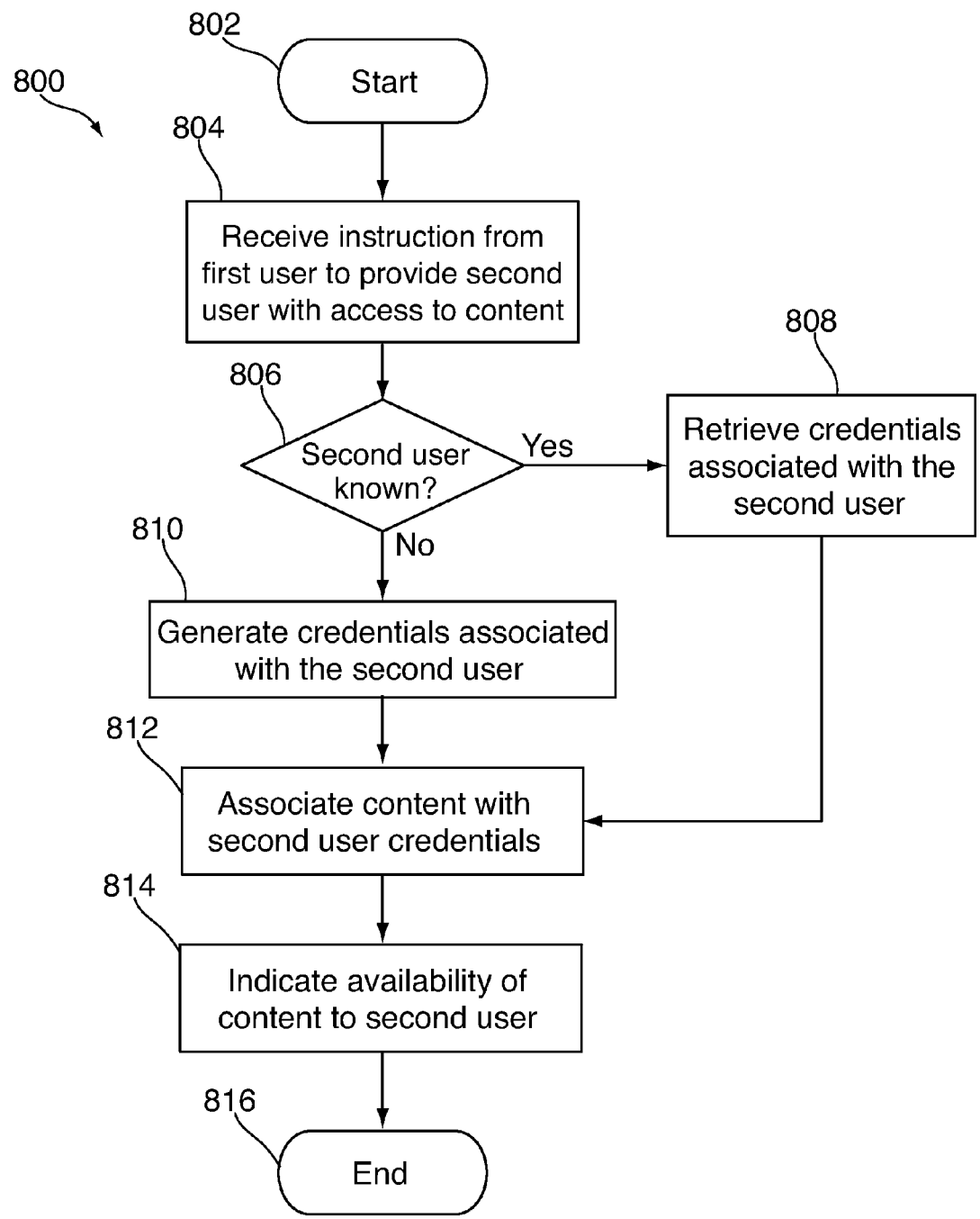
FIG. 8 is a flowchart of an illustrative process for providing authorization to a user to access content stored on a local cloud in accordance with one embodiment of the invention.

FIG. 8 is a flowchart of an illustrative process for providing authorization to a user to access content stored on a local cloud in accordance with one embodiment of the invention. Process 800 can begin at step 802. At step 804, a librarian can receive an instruction from a first user to provide a second user with access to content. For example, a librarian can receive an instruction from a first user providing identification (e.g., an email address), and identifying particular content available from a local cloud associated with the first user. The local cloud can be provided from devices that do not include any devices of the second user (e.g., the first user does not trust the second user for forming a local cloud). The instruction can be provided using any suitable approach, including for example from an interface dedicated to managing the access of content stored on the local cloud. Any device owned by the first user can provide the indication to the librarian. For example, the first user can own a first device used to interact with a cloud (e.g., and perhaps providing resources to the cloud), and a second device hosting the content being shared (e.g., where some storage resources of the second device are available to the cloud). The user can use the first device to direct the second device to authorize the second user to access the content. The second device (e.g., hosting the content) can then provide an instruction or indication to the librarian that the second user is authorized to access the content hosted or stored by the second device.

At step 806, the librarian can determine whether the second user is known to the librarian. For example, the librarian can determine whether the email address provided with the instruction is known (e.g., is an email address that has been used to generate a local cloud, or has received access to other content). In some embodiments, the librarian can determine whether additional identifying information (e.g., a name, location or social connection) matches another known user having a different email address. If the librarian identifies such a known user, the librarian can associate the newly received email address with the known user. If the librarian determines that the second user is known, process 800 can move to step 808. At step 808, the librarian can retrieve credentials associated with the second user. For example, the librarian can retrieve a certificate or key associated with the second user. Process 800 can then move to step 812.

If, at step 810, the librarian instead determines that the second user is unknown, the librarian can generate credentials associated with the second user. For example, the librarian can generate a key or certificate for the second user. Process 800 can then move to step 812. At step 812, the first user can associate the identified content with the second user. For example, the first user can direct a device to authorize the second user to access the content. In some embodiments, the first user's device can associate credentials of the second user, or an identity associated with the second device (e.g., an email) with the content. Alternatively, the credentials provided by the librarian for the second user can serve to validate the identity of the second user. In some embodiments, steps 810 and 812 can occur simultaneously. In other embodiments, portions of step 812 can occur as part of step 804 (e.g., when a second device, owned by the first user and hosting the content, provides the instruction to the librarian, as described above in connection with step 804). At step 814, the librarian can indicate the availability of the content to the second user. For example, the librarian can send an indication to the second user to connect to the local cloud to view the content. As another example, a device of the second user can ping the librarian or request a list of available clouds. As still another example, a cloud to which the second user has access can automatically incorporate the content in the cloud. In some embodiments, if the second user was unknown to the librarian, the librarian can in addition transmit the generated credentials to the second user for installation to receive access to the local cloud. The indication can include, for example, a link to the content. As another example, the indication can include an instruction to operate a particular application used to access the content. Process 800 can then end at step 816.

Figure 9:
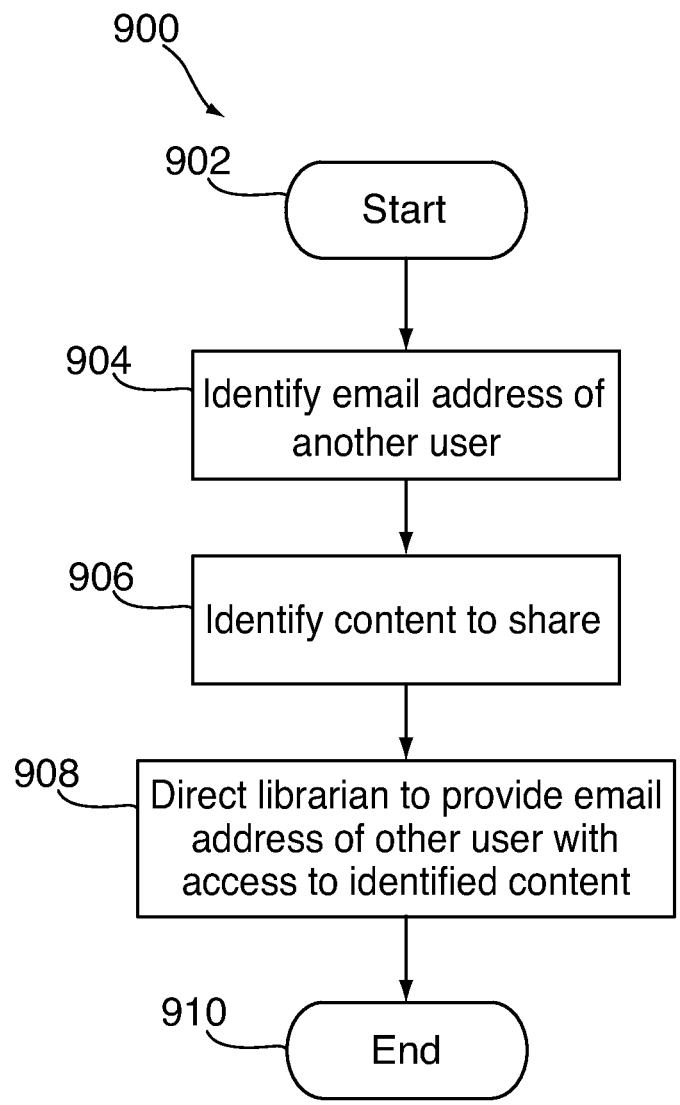
FIG. 9 is a flowchart of an illustrative process for directing a librarian to provide another user with access to content stored on a local cloud in accordance with one embodiment of the invention.

FIG. 9 is a flowchart of an illustrative process for directing a librarian to provide another user with access to content stored on a local cloud in accordance with one embodiment of the invention. Process 900 can begin at step 902. At step 904, an electronic device can identify an email address of another user with which to share information. For example, an electronic device can receive a selection of an email address of a friend from an address book. As another example, an electronic device can receive an email address entered in an appropriate interface. At step 906, the electronic device can identify content to share. For example, the electronic device can receive a selection from a user of particular content, or of a local cloud to make available to the other person. At step 908, the electronic device can direct a device hosting the identified content to share the content with the other person. For example, the electronic device can provide an instruction identifying the other person as an authorized or trusted user. The hosting device can inform a librarian that it is hosting content that the other person can access, so that the librarian can later include the hosting device in a listing of devices available to the other person. The librarian can provide an indication to the other person that the content is available, for example via a dedicated communication on behalf of the electronic device, or when the other person requests a list of available local clouds from the librarian (e.g., as described in the process of FIG. 10) Process 900 can then end at step 910.

Figure 10:
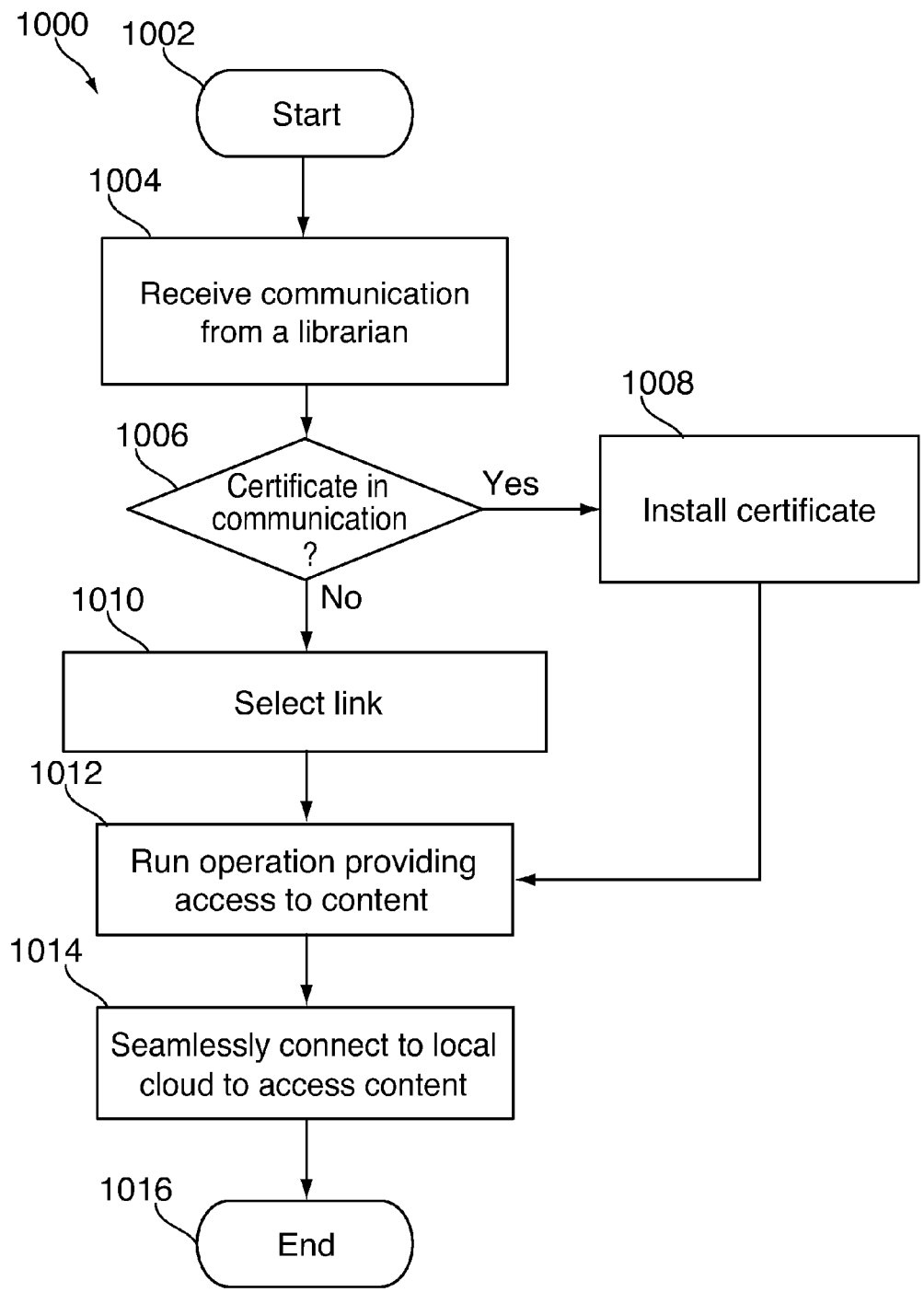
FIG. 10 is a flowchart of an illustrative process for accessing content stored on a local cloud by another user in accordance with one embodiment of the invention.

FIG. 10 is a flowchart of an illustrative process for accessing content stored on a local cloud by another user in accordance with one embodiment of the invention. Process 1000 can begin at step 1002. At step 1004, an electronic device can receive a communication from a librarian. For example, an electronic device can receive an email message from a librarian on behalf of the owner of content that provides information for accessing content of the owner from a local cloud. At step 1006, the electronic device can determine whether a certificate is included in the communication. For example, the electronic device can determine whether a key was attached to the communication. As another example, the electronic device can determine whether the communication included a link to a certificate. If the electronic device determines that a certificate is included in the communication, process 1000 can move to step 1008. At step 1008, the electronic device can install the certificate. For example, the electronic device can select the key attached to the communication and install the key in a certificate or keychain of the device. In some embodiments, the certificate can be combined with a link or instruction for accessing the content. In addition to installing the certificate, the electronic device can select the link to access the content. Process 1000 can then move to step 1012.

If, at step 1006, the electronic device instead determines that there is no certificate in the communication, process 1000 can move to step 1010. At step 1010, the electronic device can select a link embedded or included in the communication. For example, the electronic device can select a link corresponding to an instruction to access the content. At step 1012, the electronic device can run an operation providing access to the content. For example, the electronic device can execute an application for accessing a local cloud. As another example, the electronic device can execute an application in which a connection with a local cloud can be provided. At step 1014, the electronic device can seamlessly connect to the local cloud to access the content. For example, the electronic device can create a communications path with a local cloud to access the content. In some embodiments, for example when the electronic device does not receive the communication from the librarian, the electronic device can nevertheless ask the librarian for available networks (e.g., as part of a routine process). In response, the librarian can identify the local cloud. Alternatively, if the electronic device is already connected to a local cloud, the local cloud can itself automatically identify and incorporate the content in the local cloud. Process 1000 can then end at step 1016.

Although many of the embodiments of the present invention are described herein with respect to personal computing devices, it should be understood that the present invention is not limited to personal computing applications, but is generally applicable to other applications.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above described embodiments of the invention are presented for purposes of illustration and not of limitation.

What is claimed is:

1. A method for authorizing access to content stored on a local cloud, the method comprising:
   receiving, at a librarian service operating on a master device, a request from a first device to provide a third device with access to the content stored on a second device, wherein:
      the first device and the second device are associated with a first user account,
      the third device is associated with a second user account, and
      the librarian service selects the first and second devices to form the local cloud associated with the first user account based on one or more resources of each of the first and second devices made available for the local cloud;
   receiving, at the librarian service from the second device, an indication that the third device associated with the second user account is authorized to access the content stored on the second device;
   determining, at the librarian service, whether the third device associated with the second user account is known to the librarian service, wherein said determining involves determining whether the third device has been made available to the librarian service to form another local cloud;

when the third device associated with the second user account is determined to be known to the librarian service:
  identifying credentials associated with the second user account, and
  when the credentials are already installed at the third device associated with the second user account, associating the credentials with the content to provide the third device authorization to access the content; and providing by the librarian service, addressing information for the local cloud to the third device associated with the second user account, wherein the addressing information is used by the third device to connect to the local cloud to gain access to the content stored on the second device.

2. The method of claim 1, further comprising:
identifying the first user account associated with the request; and
determining access rights for the content based on the request.

3. The method of claim 1, wherein the request comprises identifying information associated with the second user account.

4. The method of claim 3, wherein the identifying information comprises at least one of:
an email address; and
a telephone number.

5. The method of claim 1, further comprising:
determining that the third device associated with the second user account is new to the librarian service; and
generating new credentials for the second user account.

6. The method of claim 1, wherein identifying credentials associated with the second user account comprises retrieving previously generated credentials associated with the second user account.

7. The method of claim 1, further comprising:
adding the credentials to an access control list associated with the content.

8. The method of claim 1, wherein providing the addressing information for the local cloud further comprises:
providing, to the third device associated with the second user account, a network address for at least one node of the local cloud.

9. The method of claim 8, wherein:
the at least one node operates a service indicating how to access the content.

10. The method of claim 1, further comprising:
adding the content to the another local cloud associated with the second user account.

11. The method of claim 1, further comprising:
providing, to the third device associated with the second user account, an instruction to operate a particular application used to access the content.

12. An electronic device for controlling access to content in local clouds, the electronic device comprising a processor configured to:
identify a plurality of devices associated with a first user account;
define a local cloud comprising the plurality of devices associated with the first user account, wherein the local cloud is defined based on one or more resources of each device of the plurality of devices made available for the local cloud;
receive, at a librarian service operating on the electronic device, a request from a first device in the local cloud to allow a third device access to the content stored on a second device in the local cloud, wherein the third device is associated with a second user account;
receive, at the librarian service from the second device, an indication that the third device associated with the second user account is authorized to access the content stored on the second device;
determine whether the third device associated with the second user account is known to the librarian service, wherein to determine whether the third device is known to the librarian service the processor is further configured to determine whether the third device has been made available to the librarian service to form another local cloud;
when the third device associated with the second user account is determined to be known to the librarian service:
  identify credentials associated with the second user account, and
  when the credentials are already installed at the third device associated with the second user account, associate the credentials with the content to provide the third device authorization to access the content; and
provide addressing information for the local cloud to the third device associated with the second user account, wherein the addressing information is used by the third device to connect to the local cloud to gain access to the content stored on the second device.

13. The electronic device of claim 12, wherein the processor is further configured to:
provide an indication to the third device associated with the second user account of available access to the local cloud.

14. The electronic device of claim 13, wherein to provide the addressing information for the local cloud the processor is further configured to:
provide, to the third device associated with the second user account, a network address for at least one node of the local cloud.

15. The electronic device of claim 12, wherein the processor is further configured to:
receive a request from the third device for available local clouds; and
provide identifying information for the local cloud to the third device in response to receiving the request.

16. The electronic device of claim 12, wherein the processor is further configured to:
determine that the third device is not known to the librarian service;
generate new credentials for the second user account; and
transmit the new credentials to the third device.

17. The electronic device of claim 16, wherein the processor is further configured to:
associate the new credentials with an access list of the local cloud.

18. A non-transitory computer-readable storage medium storing instructions that, when executed by a processor included in a computing device, cause the computing device to authorize access to content stored on a local cloud, by carrying out steps that include:
receiving, at a librarian service operating on a master device, a request from a first device to provide a third device with access to the content stored on a second device, wherein:

the first device and the second device are associated with a first user account, the third device is associated with a second user account, and the librarian service selects the first and second devices to form the local cloud associated with the first user account based on one or more resources of each of the first and second devices made available for the local cloud;

receiving, at the librarian service from the second device, an indication that the third device associated with the second user account is authorized to access the content stored on the second device;

determining, at the librarian service, whether the third device associated with the second user account is known to the librarian service, wherein said determining involves determining whether the third device has been made available to the librarian service to form another local cloud;

when the third device associated with the second user account is determined to be known to the librarian service:

identifying credentials associated with the second user account, and when the credentials are already installed at the third device associated with the second user account, associating the credentials with the content to provide the third device authorization to access the content; and providing, by the librarian service, addressing information for the local cloud to the third device associated with the second user account, wherein the addressing information is used by the third device to connect to the local cloud to gain access to the content stored on the second device.

19. The non-transitory computer-readable storage medium of claim 18, wherein the steps further include:

determining that the third device associated with the second user account is new to the librarian service; and generating new credentials for the second user account.

* * * * *